United States Patent [19]

Evans

[11] 4,325,662

[45] Apr. 20, 1982

[54] TUBULAR KEY CUTTING MACHINE

[75] Inventor: Mark Evans, Shavertown, Pa.

[73] Assignee: Henry Bartos, Dallas, Pa.

[21] Appl. No.: 137,517

[22] Filed: Apr. 4, 1980

[51] Int. Cl.³ .............................................. B23C 3/35
[52] U.S. Cl. ...................................... 409/82; 76/110; 279/1 E; 408/54
[58] Field of Search ..................... 409/81, 82, 83, 165; 76/110; 408/54; 279/1 E

[56] References Cited

U.S. PATENT DOCUMENTS

| | | | |
|---|---|---|---|
| 1,978,009 | 10/1934 | Caron | 409/82 |
| 2,671,233 | 3/1954 | Marchant et al. | 409/165 X |
| 3,418,882 | 12/1968 | Brand | 409/82 |
| 3,818,798 | 6/1974 | Kotov et al. | 409/82 |
| 4,022,107 | 5/1977 | Falk | 409/82 |
| 4,062,261 | 12/1977 | Stahl | 409/81 X |
| 4,203,693 | 5/1980 | Schwartz et al. | 409/81 |

Primary Examiner—Z. R. Bilinsky

Attorney, Agent, or Firm—Jack C. Munro

[57] ABSTRACT

A machine for cutting a tubular key from a tubular key blank. The tubular key blank is mounted on a stanchion and is rotatable in respect thereto. Also, the tubular key blank is movable a limited lineal distance in respect to the stanchion. A key ejector assembly is connected with the key blank supporting mechanism to manually eject the key after the key has been cut. A cutter is mounted on a mounting assembly which is lineally movable in two directions (perpendicular to each other) in respect to the base. Measurement means in the form of a plurality of dial indicators are mounted between the base and the mounting assembly to accurately ascertain the extent of movement of the mounting assembly in respect to the tubular key blank. A decoder mechanism is mounted on the base which is to be used to measure the length of grooves already cut within a tubular key permitting that key to be duplicated within the tubular key blank mounted within the key supporting structure.

7 Claims, 6 Drawing Figures

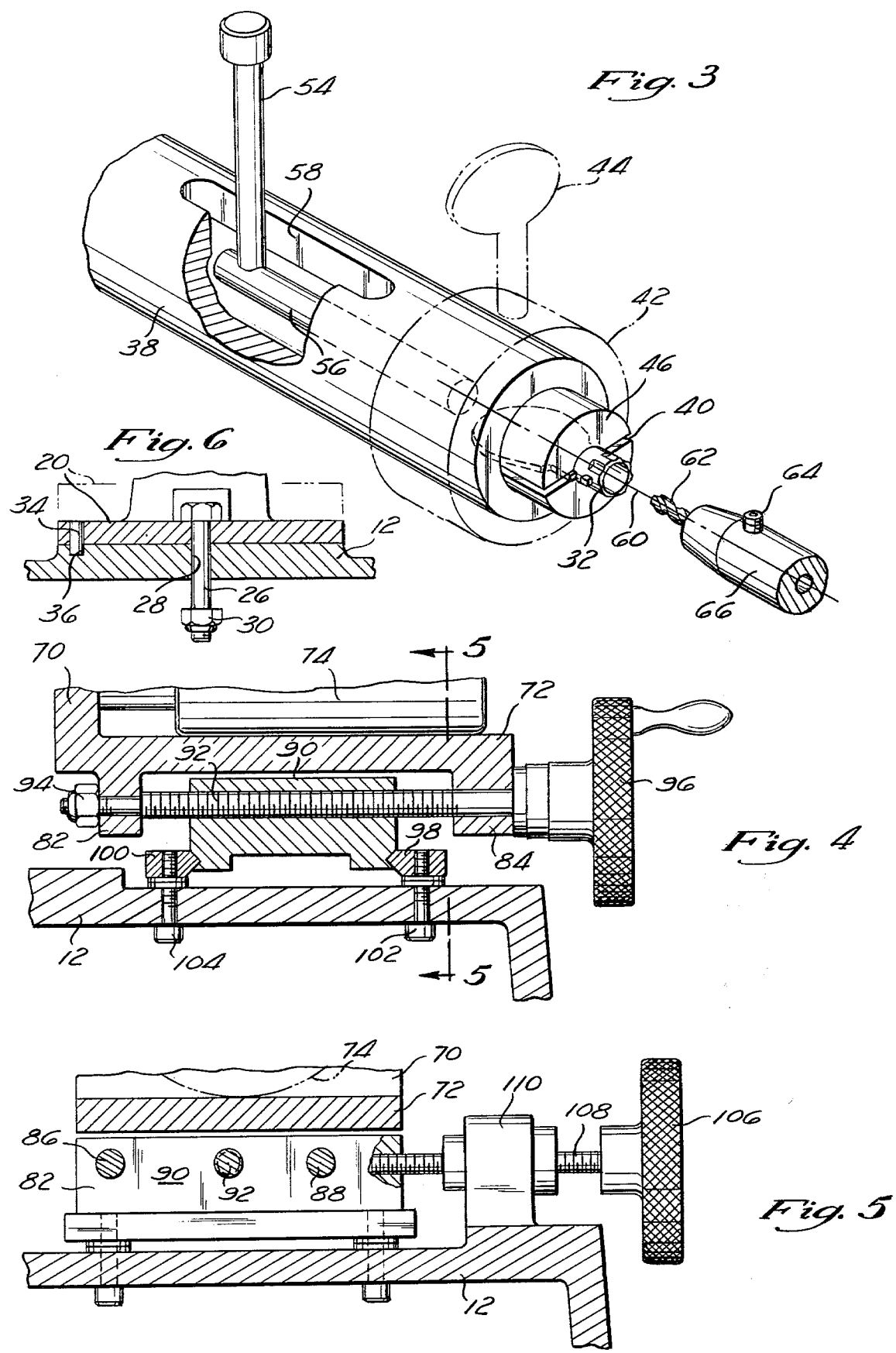

TUBULAR KEY CUTTING MACHINE

BACKGROUND OF THE INVENTION

The field of this invention relates to the manufacture of tubular types of keys and more particularly to a machine for duplicating such keys. This invention also relates to a machine for the manufacturing of a key from instructions without reference to a particular key to be duplicated.

Within the prior art there have been tubular key manufacturing machines. However, these machines have been complex in construction, of substantially large size, and extremely expensive. There is a need for a relatively inexpensive tubular key cutting machine which could be made available to every locksmith.

SUMMARY OF THE INVENTION

A machine for the manufacture of a tubular key which is mounted on a small base. A tubular key blank is fixedly mounted within a chuck. The chuck is attached to a shaft which is rotatable on a stanchion and is fixable at any angular position in respect to the stanchion. An ejector assembly is included within the shaft which is to manually operate to facilitate removal of the key from the shaft after the key has been cut. A cutter is employed which is to be movable longitudinally and transversely with respect to the key. The cutter is mounted on a mounting assembly which is mounted on the base. Manually operable crank and screw assemblies are employed to effect movement of the mounting assembly with respect to the key blank. The cutter is to cut a plurality of evenly spaced-apart, elongated grooves on the exterior surface of the key blank. A plurality of dial indicators are mounted between the base and the mounting assembly to accurately measure the extent of movement of the mounting assembly with respect to the key blank. A separate dial indicator is mounted on the base and is to be used to measure the grooves of an already formed key for purposes of duplication.

BRIEF DESCRIPTION OF THE DRAWINGS

FIG. 3 is an enlarged view of the key ejector mechanism employed in conjunction with the key supporting chuck of this invention;

FIG. 4 is a cross-sectional view through the cutter mounting assembly taken along line 4—4 of FIG. 1;

FIG. 5 is a cross-sectional view taken along line 5—5 of FIG. 4; and

FIG. 6 is a cut-away view taken along line 6—6 of FIG. 2.

DETAILED DESCRIPTION OF THE SHOWN EMBODIMENT

Figure 1:
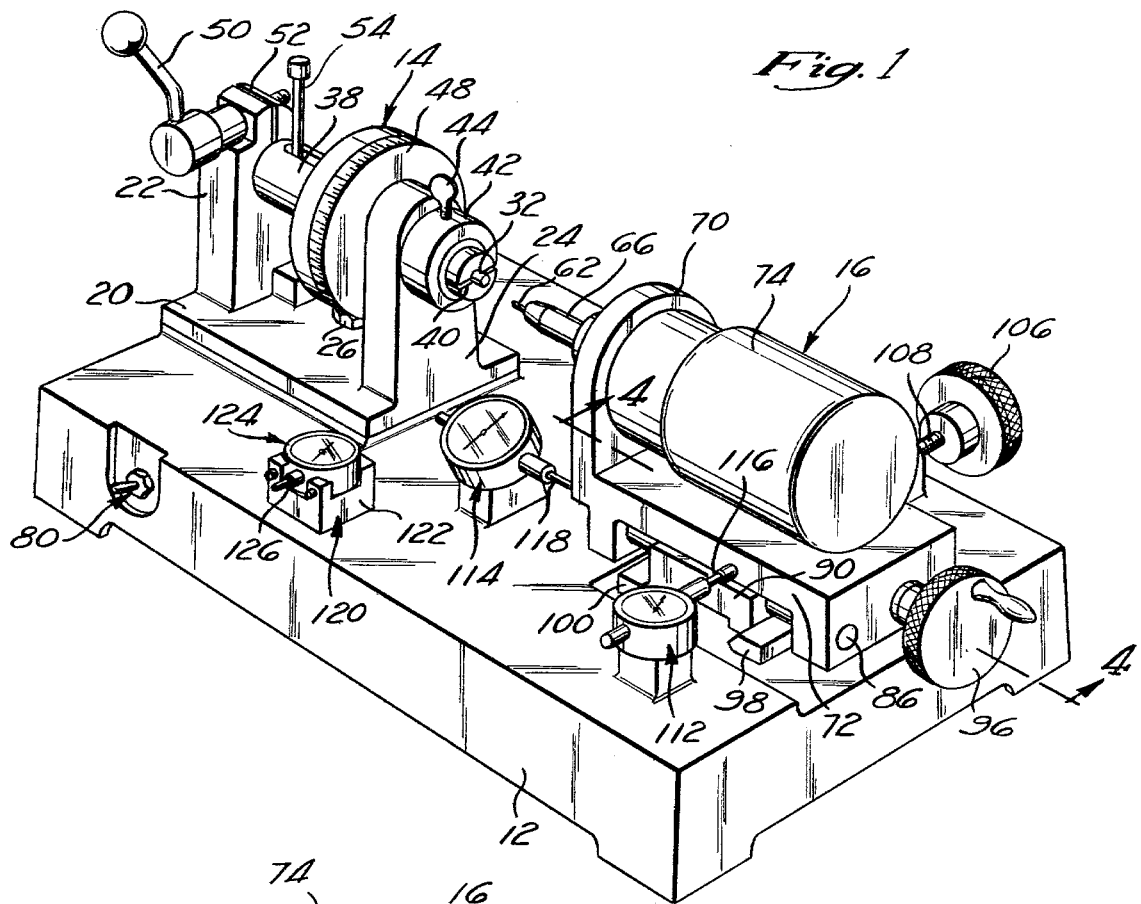
FIG. 1 is a frontal isometric view of the tubular key cutting machine of this invention.

Referring particularly to the drawings, there is shown the tubular key cutting machine 10 of this invention which includes a base 12, a tubular key supporting assembly 14, a cutting mounting assembly 14, a cutting mounting assembly 16 and a decoder mechanism 120. The decoder mechanism, 120, the cutting mounting assembly 16 and the tubular key supporting assembly 14 are all mounted on the base 12.

Figure 2:
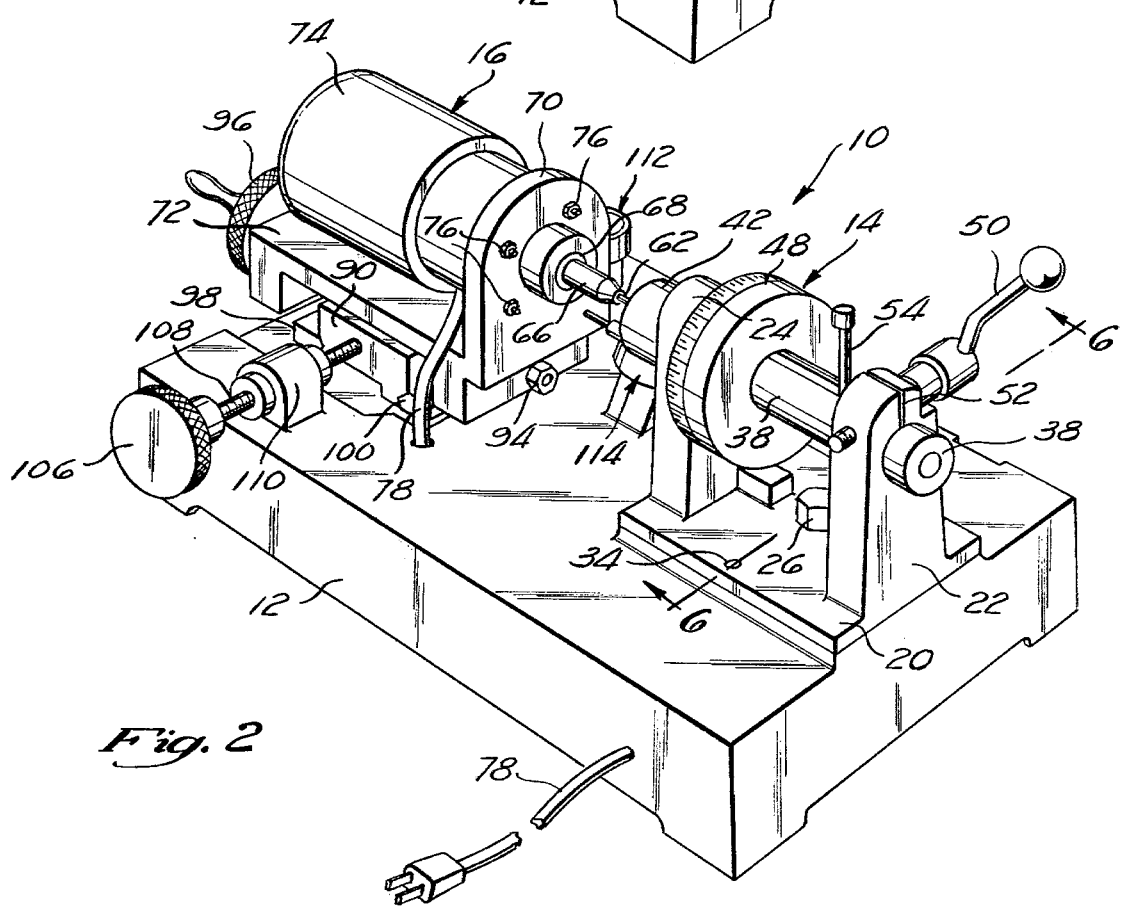
FIG. 2 is a rear isometric view of the tubular key cutting machine of this invention.

The tubular key supporting assembly takes the form of a bifurcated stanchion which is composed of a flat base 20 from which extends upstanding legs 22 and 24. Extending from the lower side of the flat base 20 is a bolt 26. The bolt 26 extends through a hole 28 formed within the base 12. A nut 30 connects with the bolt 26 adjacent the lower surface of the base 12. Normally, the nut 30 will not be tightly engaged against the base 12 so as to permit the flat base 20 to be pivoted from its position shown in FIGS. 1 and 2 of the drawings. This pivoting motion is so as to move the tubular key blank 32 away from the cutting operation area so as to make the tubular key supporting assembly more accessible for the changing of key blanks. When the tubular key supporting assembly is in the normal cutting operation position, an alignment pin 34, which is attached to the lower surface of the flat base 20, connects with a mating opening 36 formed within the base 12. This insures precise alignment of the tubular key supporting means each time it is relocated in the position to make cuts on the tubular key blank 32.

Extending through each of the upstanding legs 22 and 24 is a hollow shaft 38. The outer end of the hollow shaft 38 includes a slit 40. The tubular key blank 32 is to be positioned within the slit 40. A collar 42 is fixedly secured about the shaft 38. A thumb screw 44 is threadingly secured through the collar 42. The thumb screw 44 passes through an appropriate opening (not shown) until it engages the chuck for the key blank 32 which comprises a plug member 46. Plug member 46 is press fitted within the shaft 38. The plug member 46 includes a slit 40. Once a key blank 32 is located within the slit 40, tightening of the thumb screw 44 which presses against the outside of the plug member 46 causes sufficient force pressed against the plug member to press against the key blank 32 thereby holding the key blank 32 tightly in position.

Fixedly secured on the shaft 38 adjacent the inside surface of the leg 24 is an enlarged collar 48. The collar 48 has on its peripheral surface a scale which constitutes an even distribution of lines to denote angular position. The scale is coordinated to the position of the key blank 32. With the key blank 32 inserted in its proper position and located at a point ready to begin cutting operations on the key blank 32, the scale should denote at the uppermost point thereof a reading of zero degrees. By pivoting of the collar 48 to various angular positions, the key blank 32 will also be pivoted to these angular positions.

It is to be understood that ultimately there will be a series of grooves angularly spaced apart formed on the exterior surface of the key blank 32. To precisely locate each of these grooves, the collar 48 is rotated and the measuring scale observed to determine the exact position that is desired. Once the exact position is obtained, handle 50 is pivoted which exerts a force across slot 52 of leg member 22. This compresses tightly the leg member 22 against the shaft 38 thereby holding it in a fixed position.

After the key blank 32 has been cut in the desired manner, there is provided an ejector mechanism to facilitate removal of the key blank 32 from the plug member 46. This ejection mechanism takes the form of a handle 54 which connects with a rod 56. The handle 54 extends through an elongated slot 58 formed within the shaft 38. The rod 56 is located within the interior of the shaft 38. The outer end of the rod 56 is to physically contact the key blank (which is now a formed tubular key) and push such out of engagement with the plug member 46. Once the key 32 has been removed, the operator merely by moving handle 54 moves the rod 56 back to the inoperative position shown in FIGS. 1 and 3 of the drawings.

It may be desirable to adjust the position of the tubular key blank 32 with respect to the area of cutting. In order to provide for this, a limited amount of lineal movement along the longitudinal center axis 60 of the tubular key blank 32 is provided by the shaft 38. The extent of this movement is determined by the enlarged collar 48 and by the collar 42 each of which come into contact with opposite sides of the upstanding leg 24. Normally no more than one inch is permitted for this movement.

Assume that the axis 60 lies within a plane which is parallel to the upper surface of the base 12. The longitudinal center axis of the cutter 62 will continuously lie in this plane. As it will become apparent further on in the specification, the cutter 62 is capable of movement along x and y axes within this plane, but is not capable of being moved outside of the plane.

The cutter 62 can either take the form of an end mill or may take the form of a drill. However, it is envisioned that the most appropriate type of tool would be the end mill.

The cutter 62 is fixedly secured by set screw 64 to a shaft 66. The shaft 66 is rotationally mounted by a bearing assembly 68 whthin a block 70. The block 70 is integrally attached to a plate 72. A motor housing 74 which contains a motor (not shown) is fixedly mounted by means of fastener 76 to the block 70. The motor housing 74 also rests on the plate 72. The motor within the motor housing 74 is to be electrically driven from a source of electrical energy (not shown) which is conducted through electrical conductor 78. Within the electrical circuit is located a conventional on-off electrical switch 80 which is mounted within the base 12. It is to be understood that the motor within the motor housing 74 causes rotation of the cutter 62.

The lower surface of the plate 72 includes a pair of parallel spaced-apart mounting member 84 and 82. Fixedly secured between the mounting members 82 and 84 are a pair of spaced-apart rods 86 and 88. The rods 86 and 88 pass through a mounting block 90 of the cutting mounting assembly 16. The plate 72 is capable of movement with respect to the block 90 on the rods 86 and 88 through the use of an elongated screw 92 which is threadably retained within the block 90. One end of the screw 92 is fixedly attached to a manually operated crank wheel 96. The screw thread 92 is rotatable with respect to the extensions 82 and 84 but remains longitudinally fixed in respect thereto. Therefore, by rotation of crank wheel 96, the plate 72 is movable along the rods 86 and 88 in a controlled manner. This movement moves the cutter 62 toward and away from (parallel to axis 60) the key blank 32.

The mounting block 90 has an elongated V-shaped notch formed within each side of a pair of opposite sides. Matingly connecting with one of the notches is a first block 98. A second block 100 matingly connects with the opposite notch. Block 98 is fixedly supported on the base 12 by means of bolt fastener 102. The second block 100 is secured to the base 12 by means of bolt fastener 104. By physically positioning of the blocks 98 and 100, the block 90 is snugly held in position and not permitted to move longitudinally (toward or away from the key blank 32). However, the block 90 is permitted to move transversely with, in essence, the blocks 98 and 100 functioning as a guide track. This movement of the blocks is accomplished through the use of a manually operated crank 106 which is attached to threaded rod 108 which in turn is threadably secured within the block 90. The threaded rod 108 is rotatably mounted within journal 110 which is fixedly secured to the base 12. It is readily apparent that by turning of the crank 106 that the threaded rod 108 is threaded into or out of the block 90, which in turn, causes the block 90 to be moved along the guide track produced by blocks 98 and 100.

It should now be readily apparent that once the key blank 32 is established in its desired position, that the cutter 62 can be moved to contact the key blank at the desired point of contact. Longitudinal movement of the cutter 62 is accomplished by rotating of the crank 96 and transverse movement of the cutter 62 is accomplished by turning of the crank 106.

The forming of each groove within the key blank 32 has to be accomplished with a high degree of precision. In order to achieve this precision, there is mounted on the base 12 measuring dial indicating mechanisms 112 and 114. The indicating mechanisms 112 and 114 are deemed in and of themselves to be conventional and form no specific part of this invention. Basically, each dial indicating mechanism 112 and 114 comprise a housing which has a dial face and a movable pointer located over the dial face. The dial indicator 112 has a probe 116 and dial indicator mechanism 114 has a probe 118. The physical movement against the probes 116 and 118 causes the pointer of its respective dial indicator mechanism to move across the dial indicator face. The dial indicator mechanisms 112 and 114 can mormally ascertain movements with an accuracy of at least one thousanth of an inch.

The probe 116 is in contact with the plate 72. Therefore, the dial indicator mechanism 112 can read the amount of transverse movement of the cutter 62 which is caused by rotating of crank 106.

The probe 118 is in contact with block 70. Therefore, the dial indicator mechanism 114 measures the extend of longitudinal movement of the cutter 62 which is caused by the rotating of the crank 96.

Once a key blank 32 has been set in its desired position, a certain groove is determined to be cut within the blank 32. The length of this groove is known, either from instructions or from observing an already manufactured key. The operator then rotates the crank 96 until the cutter 62 just touches the outermost edge of the key blank 32. The dial indicator mechanism 114 is then set at zero. The operator then reverses crank 96 so as to move the cutter 62 a slight distance away from the key blank 32. The operator then turns crank 106 until the cutter 62 is transversely displaced a slight distance from the key blank 32. The operator then turns the crank 96 until dial indicator mechanism 114 shows the desired longitudinal measurement for the particular groove to be cut. The operator then turns crank 106 until the cutter 62 just contacts the exterior cylindrical surface of the key blank 32. At this time, the dial indicator mechanism 112 is located at zero. The switch 80 is thrown which causes the cutter (presumed to be an end mill) to rotate. The operator then turns crank 106 causing the end mill to cut into the key blank 32. Crank 106 is continued to be turned until the desired depth of the groove is achieved by reading of the dial indicator mechanism 112.

At this time, crank 106 is reversed causing the cutter 62 to be spaced from the key blank 32. The operator then loosens handle 50 and rotates the enlarged collar 48 and by reading the appropriate angle indicia thereon, pivots the tubular key blank 32 until the key blank is in its desired position for the next cut. At this time, the handle 50 is again tightened and the cutting procedure which is mentioned previously is repeated. There will normally be seven cuts within each key blank 32.

When it is desired to duplicate an already manufactured key as opposed to constructing a key from instructions, a decoder mechanism 120 is mounted on the base 12. This decoder mechanism 120 takes the form of a block 122 which is fixedly secured to the base 12. Supported within the block 122 is a dial indicating mechanism 124 which is basically similar to the previously mentioned dial indicating mechanisms 112 and 114. The dial indicating mechanism 112 has a probe 126. The probe 126 is moved inwardly until the tip is flush with the adjacent planar side of the block 122. In this position, the dial indicator mechanism 124 is adjusted to zero. The operator can then position the probe 126 within a groove of a key (not shown) which is to be duplicated. The probe 126 will move the entire length of that particular groove. The extent of this movement can be measured by reading of the dial indicator mechanism 124. This measurement value then only need to be duplicated within the dial indicator mechanism 114 and an identically lengthed groove will be formed within the key blank 32.

What is claimed is:

1. A tubular key cutting machine comprising:
   a base;
   first means for retaining a tubular key blank to be cut, a shaft, said first means includes a chuck fixed to said shaft, said tubular key blank being fixedly held by said chuck establishing a longitudinal center axis for said tubular key blank, a stanchion assembly, said shaft being rotatably mounted on said stanchion assembly, said stanchion assembly being fixedly mounted on said base;
   a cutter for cutting a plurality of grooves within the exterior surface of the tubular key blank, said cutter being rotatably driven by a motor, said motor being mounted on a mounting assembly, said mounting assembly being separately lineally movable along both a first direction and a second direction, said first direction being parallel to said longitudinal center axis, said second direction being perpendicular to said first direction;
   measurement means for accurately determining the position of said cutter in respect to said tubular key blank along said first and second directions, said measurement means comprising a plurality of separate dial indicator devices, each said dial indicator device being mounted between said base and said mounting assembly to thereby sense the position of said mounting assembly in respect to said base; and
   said first means being pivotally mounted on said base, said first means to be located into a single key cutting position during cutting of said tubular key blank, an alignment pin and opening located between said first means and said base which matingly cooperate when said first means is in said single key cutting position.

2. A tubular key cutting machine comprising:
   a base;
   first means for retaining a tubular key blank to be cut, a shaft, said first means includes a chuck fixed to said shaft, said tubular key blank being fixedly held by said chuck establishing a longitudinal center axis for said tubular key blank, a stanchion assembly, said shaft being rotatably mounted on said stanchion assembly, said stanchion assembly being fixedly mounted on said base;
   a cutter for cutting a plurality of grooves within the exterior surface of the tubular key blank, said cutter being rotatably driven by a motor, said motor being mounted on a mounting assembly, said mounting assembly being separately lineally movable along both a first direction and a second direction, said first direction being parallel to said longitudinal center axis, said second direction being perpendicular to said first direction;
   measurement means for accurately determining the position of said cutter in respect to said tubular key blank along said first and said second directions, said measurement means comprising a plurality of separate dial indicator devices, each said dial indicator device being mounted between said base and said mounting assembly to thereby sense the position of said mounting assembly in respect to said base; and
   a key ejection apparatus connected with said first means, said key ejection apparatus comprising a manually movable member which is to be employed to dislodge said tubular key blank from said chuck.

3. A tubular key cutting machine comprising:
   a base;
   first means for retaining a tubular key blank to be cut, a shaft, said first means includes a chuck fixed to said shaft, said tubular key blank being fixedly held by said chuck establishing a longitudinal center axis for said tubular key blank, a stanchion assembly, said shaft being rotatably mounted on said stanchion assembly, said stanchion assembly being fixedly mounted on said base;
   a cutter for cutting a plurality of grooves within the exterior surface of the tubular key blank, said cutter being rotatably driven by a motor, said motor being mounted on a mounting assembly, said mounting assembly being separately lineally movable along both a first direction and a second direction, said first direction being parallel to said longitudinal center axis, said second direction being perpendicular to said first direction;
   measurement means for accurately determining the position of said cutter in respect to said tubular key blank along said first and said second directions, said measurement means comprising a plurality of separate dial indicator devices, each said dial indicator device being mounted between said base and said mounting assembly to thereby sense the position of said mounting assembly in respect to said base; and
   said chuck is capable of being lineally moved a limited distance in respect to said stanchion, fixing means connected to said stanchion, said fixing means being capable of fixing the position of said chuck in respect to said stanchion.

4. A tubular key cutting machine comprising:
   a base:
   first means for retaining a tubular key blank to be cut, a shaft, said first means includes a chuck fixed to said shaft, said tubular key blank being fixedly held by said chuck establishing a longitudinal center axis for said tubular key blank, a stanchion assembly, said shaft being rotatably mounted on said stanchion assembly, said stanchion assembly being fixedly mounted on said base;

a cutter for cutting a plurality of grooves within the exterior surface of the tubular key blank, said cutter being rotatably driven by a motor, said motor being mounted on a mounting assembly, said mounting assembly being separately lineally movable along both a first direction and a second direction, said first direction being parallel to said longitudinal center axis, said second direction being perpendicular to said first direction;

measurement means for accurately determining the position of said cutter in respect to said tubular key blank along said first and second directions, said measurement means comprising a plurality of separate dial indicator devices, each said dial indicator device being mounted between said base and said mounting assembly to thereby sense the position of said mounting assembly in respect to said base; and said stanchion comprising a bifurcated member having a pair of upstanding leg members, a shaft mounted within each said leg member and extending thereacross, said shaft being fixedly secured to said chuck, a key ejection apparatus mounted within said shaft, said key ejection apparatus being manually movable to dislodge said tubular key blank from said chuck.

5. The tubular key cutting machine as defined in claim 4 wherein:

said first means is pivotally mounted on said base, said first means to be located into a single key cutting position during cutting of said tubular key blank, an alignment pin and opening located between said first means and said base which matingly cooperate when said first means is in said single key cutting position.

6. The tubular key cutting machine as defined in claim 5 wherein:

said shaft is lineally movable a limited distance in respect to said stanchion, fixing means connected to said shaft for fixing said shaft in an established position during the cutting operation.

7. A tubular key cutting machine comprising:

a base:

first means for retaining a tubular key blank to be cut, a shaft, said first means includes a chuck fixed to said shaft, said tubular key blank being fixedly held by said chuck establishing a longitudinal center axis for said tubular key blank, a stanchion assembly, said shaft being rotatably mounted on said stanchion assembly, said stanchion assembly being fixedly mounted on said base;

a cutter for cutting a plurality of grooves within the exterior surface of the tubular key blank, said cutter being rotatably driven by a motor, said motor being mounted on a mounting assembly, said mounting assembly being separately lineally movable along both a first direction and a second direction, said first direction being parallel to said longitudinal center axis, said second direction being perpendicular to said first direction;

measurement means for accurately determining the position of said cutter in respect to said tubular key blank along said first and second directions, said measurement means comprising a plurality of separate dial indicator devices, each said dial indicator device being mounted between said base and said mounting assembly to thereby sense the position of said mounting assembly in respect to said base; and a key decoder mechanism mounted on said base, said key decoder mechanism including a measuring dial indicator device, said key decoder mechanism usable to determine the length of each said groove which has been cut within an existing said tubular key and that information is then employed to effect duplication of said tubular key by cutting identical said grooves within said key blank.

* * * * *